(12) United States Patent
Hsieh et al.

(10) Patent No.: US 7,796,777 B2
(45) Date of Patent: *Sep. 14, 2010

(54) DIGITAL WATERMARKING SYSTEM ACCORDING TO MATRIX MARGIN AND DIGITAL WATERMARKING METHOD

(75) Inventors: Kuan-Hong Hsieh, Guangdong (CN); Xiao-Fang Chen, Guangdong (CN); Zai-An Pan, Guangdong (CN)

(73) Assignees: Hong Fu Jin Precision Industry (Shen Zhen) Co., Ltd., Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1111 days.

This patent is subject to a terminal disclaimer.

(21) Appl. No.: 11/308,331

(22) Filed: Mar. 16, 2006

(65) Prior Publication Data

US 2006/0285720 A1    Dec. 21, 2006

(30) Foreign Application Priority Data

Jun. 17, 2005    (CN) .................... 2005 1 0035416

(51) Int. Cl.
*G06K 9/00* (2006.01)
(52) U.S. Cl. ...................................... 382/100
(58) Field of Classification Search ................ 382/100, 382/276; 713/176, 189; 358/328
See application file for complete search history.

(56) References Cited

U.S. PATENT DOCUMENTS

| | | | | |
|---|---|---|---|---|
| 5,530,759 A | * | 6/1996 | Braudaway et al. ............ 380/54 |
| 5,875,249 A | * | 2/1999 | Mintzer et al. ................. 380/54 |
| 6,222,932 B1 | * | 4/2001 | Rao et al. ..................... 382/100 |
| 6,456,393 B1 | * | 9/2002 | Bhattacharjya et al. ...... 358/1.9 |
| 6,519,350 B1 | * | 2/2003 | Van Overveld et al. ...... 382/100 |
| 6,757,405 B1 | * | 6/2004 | Muratani et al. ............. 382/100 |
| 6,782,509 B1 | | 8/2004 | Hirayama |
| 6,850,626 B2 | | 2/2005 | Rhoads et al. |
| 7,113,612 B2 | * | 9/2006 | Sugahara et al. ............. 382/100 |
| 7,164,779 B2 | * | 1/2007 | Yerazunis et al. ............ 382/100 |

(Continued)

OTHER PUBLICATIONS

Yu et al, "A Secure Data Hiding Scheme for Binary Images", IEEE Transactions on Communications, vol. 50, No. 8, Aug. 2002.*

(Continued)

*Primary Examiner*—Vu Le
*Assistant Examiner*—Andrae S Allison
(74) *Attorney, Agent, or Firm*—Winston Hsu

(57) ABSTRACT

A digital watermarking system and method is provided. The digital watermarking system mainly includes a storing unit (30), a text obtaining module (31), a dot matrix determining module (32), an encrypting module (33), and a storing module (34). The storing unit is for storing text information, the text information including one or more dot matrix files. The text obtaining module is for obtaining one dot matrix file to be watermarked from the storing unit. The dot matrix file includes plural dot matrixes, each of which has a matrix margin and includes plural pixels. The dot matrix determining module is for earmarking the dot matrix to be adjusted to obtain a watermark. The encrypting module is for adjusting the matrix margin of the earmarked dot matrix. The storing module is for storing watermarked text information in the storing unit. Related methods are provided.

19 Claims, 9 Drawing Sheets

U.S. PATENT DOCUMENTS 7,324,662 B2 * 1/2008 Kot et al. .................. 382/100
7,436,977 B2 * 10/2008 Wang et al. ............... 382/100
2001/0009581 A1 7/2001 Hashimoto

OTHER PUBLICATIONS

WK Young, KA Moon, IS Oh: "A Text Watermarking AlgorithmBased on Word Classification and Inter-word Space Statistics" 7th International Conference on Document Analysis and Recognition 2003, pp. 775-779.*

Dong-Ning Zhao, Yong Zhang, De-Yi Li, Text Digital Watermarking Technology Based on Cloud Model, Computer Applications, Dec. 2003, pp. 100-102, vol. 23, 1001-9081(2003)12Z-0100-03.

* cited by examiner

DIGITAL WATERMARKING SYSTEM ACCORDING TO MATRIX MARGIN AND DIGITAL WATERMARKING METHOD

TECHNICAL FIELD

The present invention relates to a digital rights protection system and method, and particularly to a digital watermarking system implemented according to a matrix margin and a related digital watermarking method.

GENERAL BACKGROUND

Pirating of digitally-formatted works have been a significant obstacle towards the widespread adoption and use of the Internet for distribution of media such as books, musical works, and motion pictures. Although such network distribution would at first glance seem ideal for these media, which are easily represented in electronic format, there has been no easy way to prevent widespread illegal copying of such works once they are introduced to the public. In many cases, a person will buy a legitimate copy and then distribute illegal copies thereof to friends and others without any further payments to the publisher. This threatens the financial well-being of the publishers, and makes them very reluctant to introduce their works through the Internet.

In an attempt to solve the above described problems, digital watermarking has been developed. In general, digital watermarking is an alteration of a data set within an electronic file. The watermark can be visible or invisible to the naked human eye.

The invisible, or nearly invisible, watermark is mainly detected by a computer. The computer computes a correlation of the information under scrutiny with an applied watermark pattern, and compares the result of the correlation with a predetermined threshold difference. If the difference of the result is greater than the threshold difference, the watermark is said to be present; otherwise, it is said to be absent. The greater the difference, the more reliable the detection result is. However, with respect to works embedded with such a watermark, a great deal of computing is needed to detect the watermark and identify copyright notices and/or other verification messages in these works. In addition, once these works are printed, it becomes more difficult to accurately read or interpret information contained in the watermark due to the imperceptible characteristics of the watermark.

What is needed, therefore, is a digital watermarking system and method, which can efficiently watermark text and generate a perceptible watermark.

SUMMARY

A digital watermarking system is provided. The digital watermarking system mainly includes a storing unit, a text obtaining module, a dot matrix determining module, an encrypting module, and a storing module. The storing unit is for storing text information, the text information including one or more dot matrix files. The text obtaining module is for obtaining a dot matrix file to be watermarked from the storing unit. The dot matrix file includes a plurality of dot matrixes, and each of the dot matrixes has a matrix margin and includes a plurality of pixels. The dot matrix determining module is for earmarking the dot matrix to be adjusted for obtaining a watermark. The encrypting module is for adjusting the matrix margin of the earmarked dot matrix, the adjustment being either breadthwise adjusting the matrix margin thereof or lengthwise adjusting the matrix margin thereof. The storing module is for storing watermarked text information in the storing unit.

A digital watermarking method is also provided. The method includes the steps of: (a) obtaining text information to be watermarked, the text information including one or more dot matrix files each of which includes a plurality of dot matrixes, and each dot matrix having a matrix margin and including a plurality of pixels; (b) earmarking the dot matrix to be adjusted to obtain a watermark; (c) adjusting the matrix margin of the earmarked dot matrix, the adjustment being either to breadthwise adjust the matrix margin thereof or lengthwise adjust the matrix margin thereof; and (d) storing watermarked text information in a storing unit.

Another digital watermarking method is further provided. The method includes the steps of: (a) obtaining text information to be watermarked, the text information including one or more dot matrix files each of which includes a plurality of dot matrixes, and each of the dot matrixes has a matrix margin and includes a plurality of pixels; (b) earmarking a dot matrix of the obtained text information if a length of a bit sequence is not equal to zero, the bit sequence being for indicating copyright, author, etc; (c) adjusting the matrix margin of the earmarked dot matrix according to a bit value of one bit of the bit sequence; (d) recording the adjusted dot matrix and corresponding bit value; and (e) storing watermarked text information.

Other advantages and novel features will be drawn from the following detailed description with reference to the attached drawings, in which:

DETAILED DESCRIPTION

Figure 1:
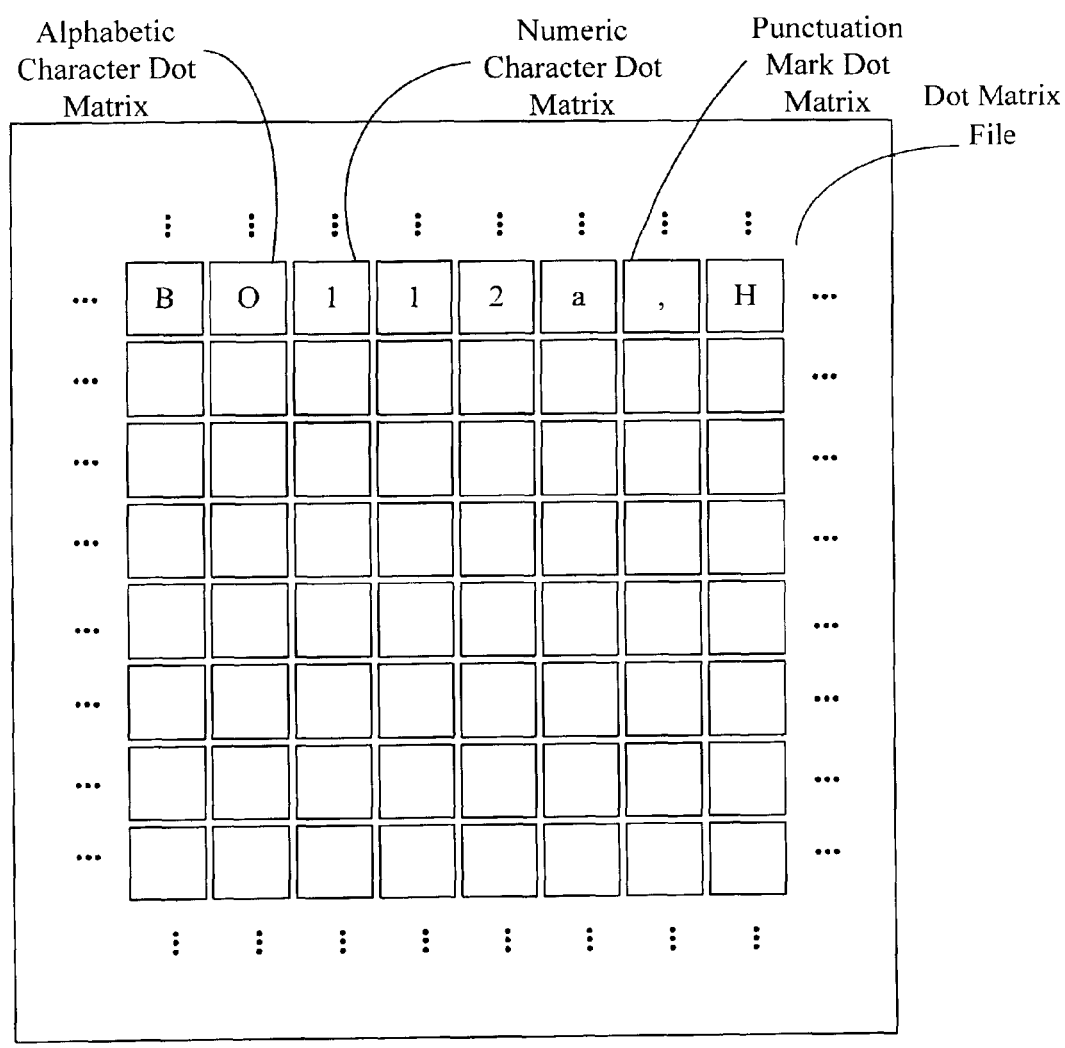
FIG. 1 is a schematic diagram of an exemplary dot matrix file in accordance with a preferred embodiment of the present invention, the dot matrix file including a plurality of dot matrixes.

FIG. 1 is a schematic diagram of an exemplary dot matrix file in accordance with a preferred embodiment of the present invention, the dot matrix file including a plurality of dot matrixes. Generally, a text comprises a collection of data of a regular structure representing such things as characters and punctuation marks. The characters can be either alphabetic characters or numeric characters. Each character, as well as each punctuation mark, is represented by and stored as a dot matrix. Correspondingly, the dot matrixes are grouped into two sorts based on their type; i.e., alphanumeric character or punctuation. In this description, unless the context indicates otherwise, alphanumeric means alphabetic or numeric.

Figure 2:
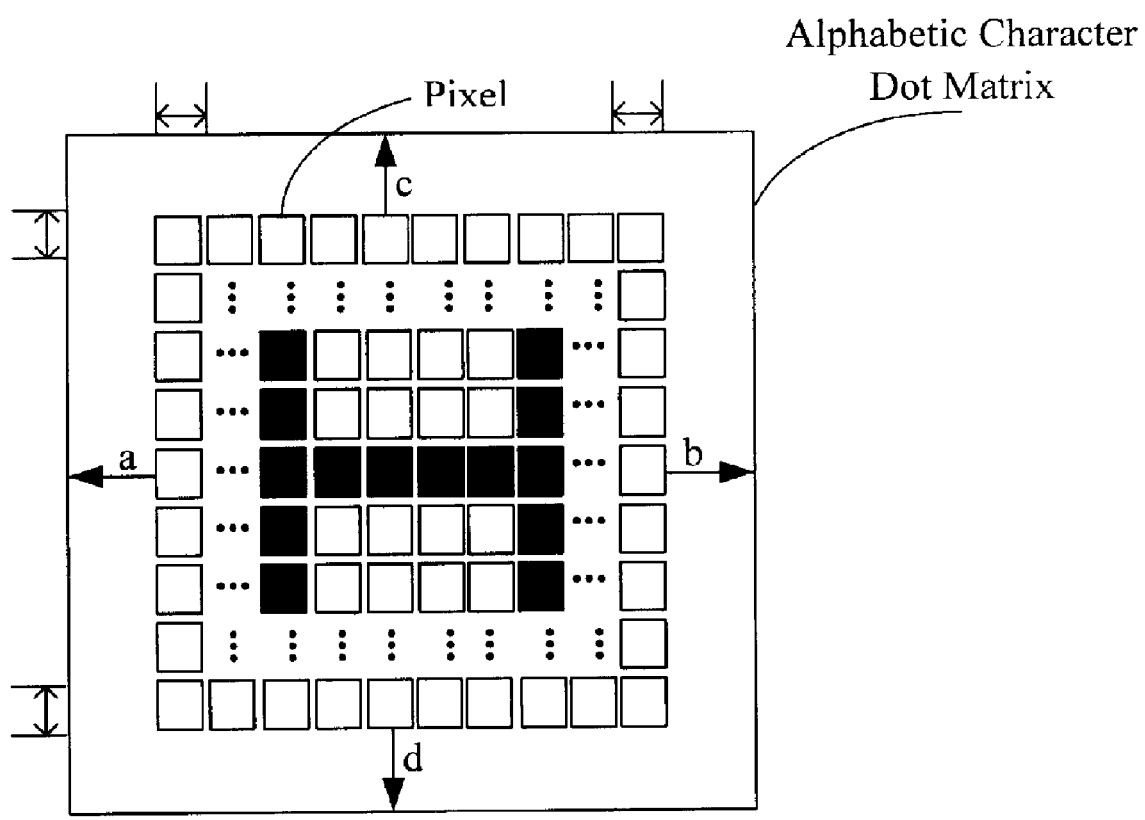
FIG. 2 is a schematic diagram of an exemplary dot matrix of the dot matrix file of FIG. 1, the dot matrix having a matrix margin and including a plurality of pixels.

FIG. 2 is a schematic diagram of an exemplary dot matrix of the dot matrix file of FIG. 1. The dot matrix has a normal matrix margin and includes a plurality of pixels each being represented by a square. Furthermore, the matrix margin thereof includes a margin-left, a margin-right, a margin-top, and a margin-bottom, each of which is indicated by 'a', 'b', 'c' and 'd' respectively.

Figure 3:
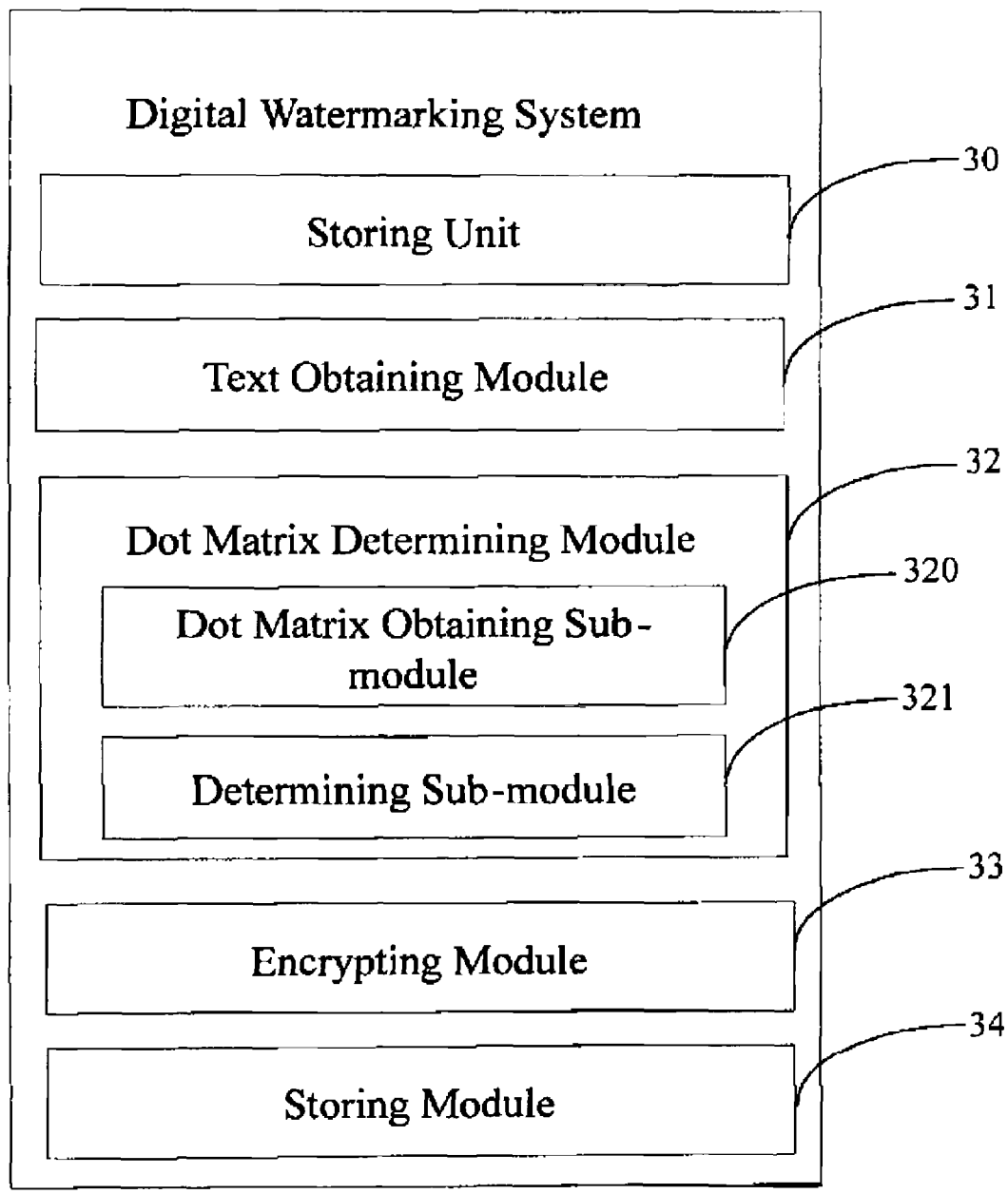
FIG. 3 is a schematic diagram of main function modules of a digital watermarking system in accordance with a preferred embodiment of the present invention.

FIG. 3 is a schematic diagram of main function modules of a digital watermarking system in accordance with a preferred embodiment of the present invention. The digital watermarking system mainly includes a storing unit 30, a text obtaining module 31, a dot matrix determining module 32, an encrypting module 33, and a storing module 34. The storing unit 30 is provided for storing dot matrix files of texts and bit sequences. The bit sequences are instructions for watermarking the texts. The text obtaining module 31 is for obtaining the dot matrix file to be watermarked from the storing unit 30.

The dot matrix determining module 32 is for determining dot matrixes to be adjusted. The dot matrix determining module 32 further includes a dot matrix obtaining sub-module 320 and a determining sub-module 321. The dot matrix obtaining sub-module 320 is for obtaining the dot matrixes to be adjusted. The determining sub-module 321 is capable of determining a type of each obtained dot matrix. That is, the determining sub-module 321 can determine whether the obtained dot matrix represents an alphanumeric character (i.e., an alphabetic character or a numeric character). Preferably, the obtained dot matrix is an alphanumeric character type dot matrix, and not a punctuation dot matrix. In such case, the obtained dot matrix is considered to be suitable for watermarking. In this description, this kind of dot matrix is referred to as an earmarked dot matrix.

The encrypting module 33 is for adjusting the matrix margins of the earmarked dot matrixes as provided by the dot matrix determining module 32, according to a predetermined adjustment value. Thereby, the adjusted dot matrixes have different matrix margins from the unadjusted dot matrixes, and thus provide a means of watermarking. Further, the adjustment can be either a breadthwise adjustment or a lengthwise adjustment in the matrix margin. Moreover, the breadthwise adjustment can be either a left shift or a right shift operation on the predetermined adjustment value (e.g., one pixel size) in the pixels of the earmarked dot matrix, thereby breadthwise adjusting the matrix margin thereof. Similarly, a lengthwise adjustment can be either an up shift or a down shift operation on the predetermined adjustment value (e.g., one pixel size) in the pixels of the earmarked dot matrix, thereby lengthwise adjusting the matrix margin thereof. Therefore each of the adjusted dot matrixes will have a different matrix margin as compared to its normal matrix margin, and the adjusted dot matrixes collectively provide a means of watermarking. The storing module 34 is for storing the watermarked dot matrix files in the storing unit 30.

Figure 4:
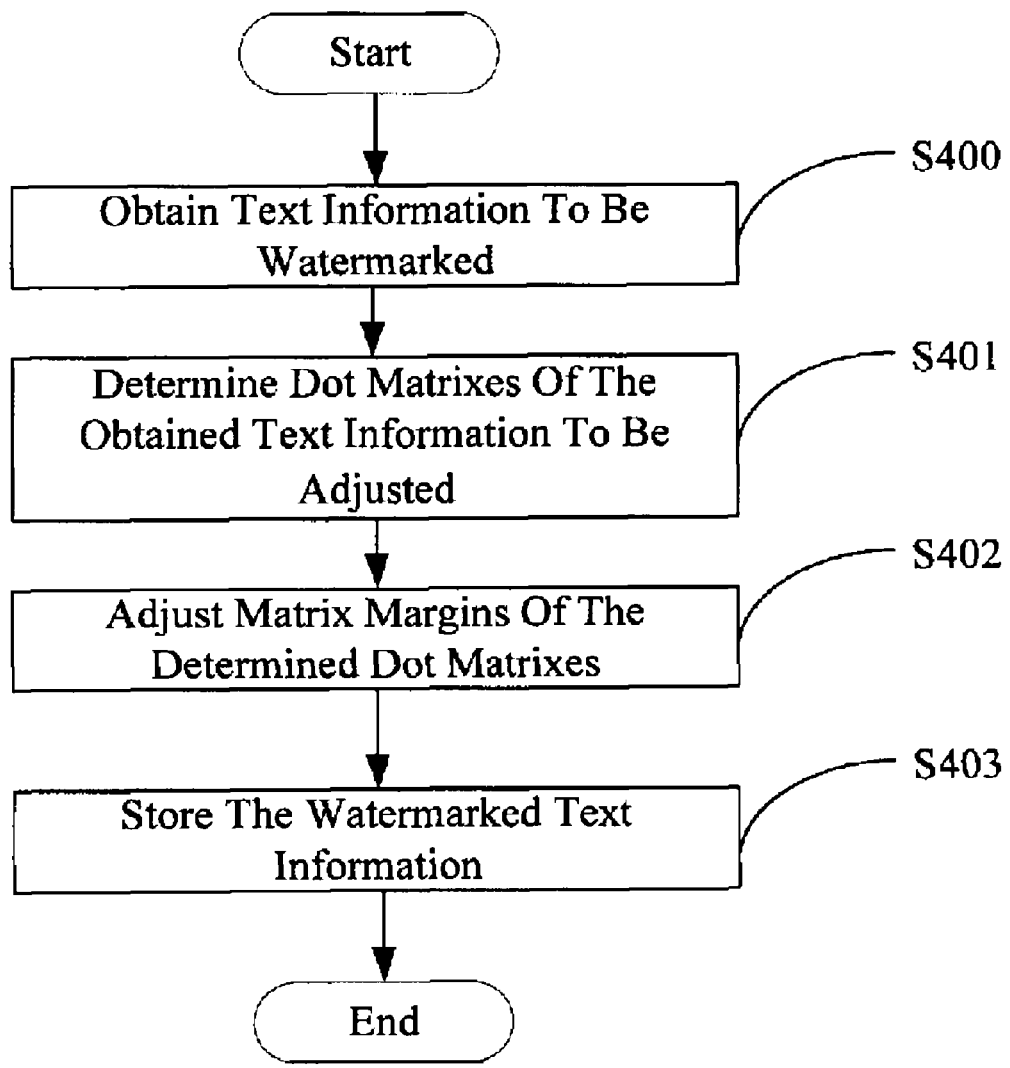
FIG. 4 is a flowchart of a preferred method for digital watermarking in accordance with another embodiment of the present invention.

FIG. 4 is a flowchart of a preferred method for digital watermarking in accordance with the present invention. In step S400, the text obtaining module 31 obtains text information, e.g., a dot matrix file, to be watermarked from the storing unit 30. In step S401, the dot matrix determining module 32 determines which dot matrixes of the obtained dot matrix file are to be adjusted. The earmarked dot matrixes preferably are alphanumeric character type dot matrixes. In step S402, the encrypting module 33 adjusts the matrix margins of the earmarked dot matrixes according to a predetermined adjustment value. The adjustments of each earmarked dot matrix can be either a breadthwise or a lengthwise adjustment in the matrix margins. Furthermore, breadthwise adjustments can be either a left shift or a right shift operation on the predetermined adjustment value (e.g., one pixel size) in the pixels of the earmarked dot matrix, similarly, lengthwise adjustments can be either an up shift or a down shift operation on the predetermined adjustment value (e.g., one pixel size) in the pixels of the earmarked dot matrix. In step S403, the storing module 35 stores the watermarked dot matrix in the storing unit 30.

By utilizing the steps of FIG. 4, the adjusted dot matrixes will have different matrix margins in comparison to the unadjusted dot matrixes. Thereby, the adjusted dot matrixes are perceptually different from the unadjusted dot matrixes. Therefore, the naked human eye can recognize and distinguish the adjusted dot matrixes from the unadjusted dot matrixes in the text.

Figure 5:
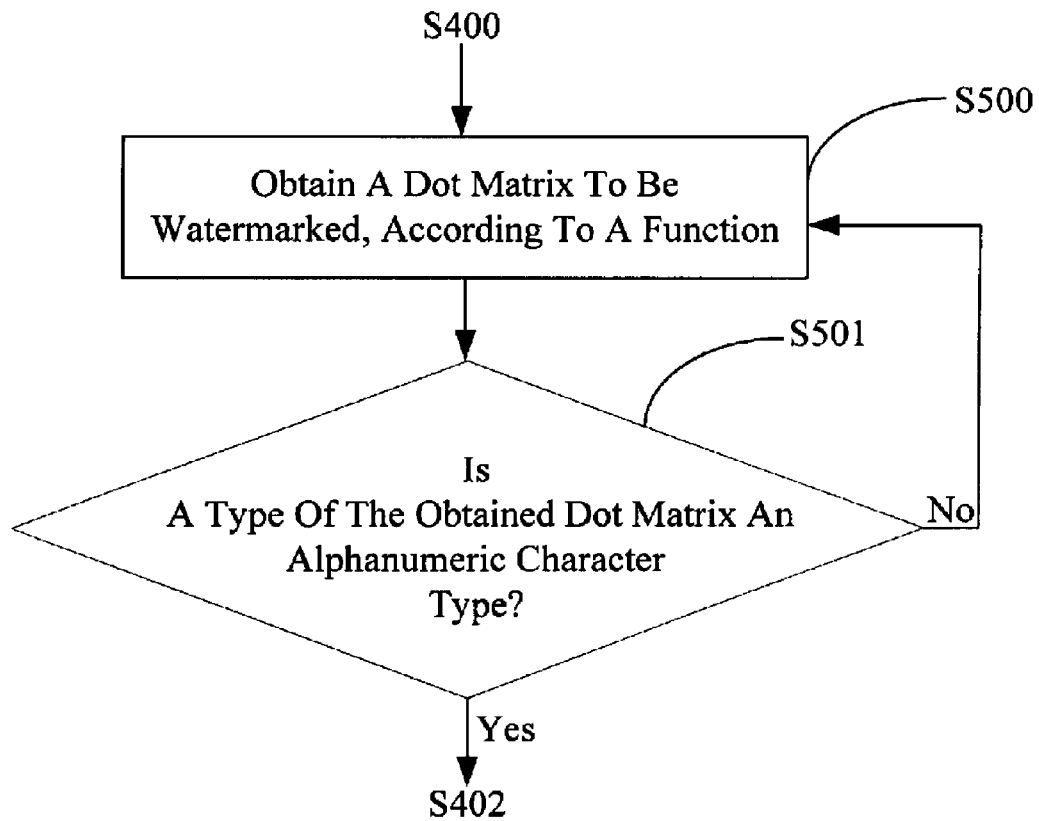
FIG. 5 is a flowchart of a preferred method of implementing one step of FIG. 4, namely determining dot matrixes to be adjusted.

FIG. 5 is a flowchart of a preferred method of implementing step S401 of FIG. 4, namely determining dot matrixes to be adjusted. In step S500, the dot matrix obtaining sub-module 320 obtains a dot matrix from the text obtaining module 31, according to a function as would be known to persons skilled in the relevant art(s). In step S501, the determining sub-module 321 determines whether the obtained dot matrix is an alphanumeric character type dot matrix. If the obtained dot matrix is not an alphanumeric character type dot matrix, the procedure goes back to step S500 to obtain a new dot matrix. Conversely, if the obtained dot matrix is an alphanumeric character type dot matrix, the procedure goes to step S402 described above. Therefore, by utilizing the steps of FIG. 5, an alphanumeric character type dot matrix is obtained.

Figure 6:
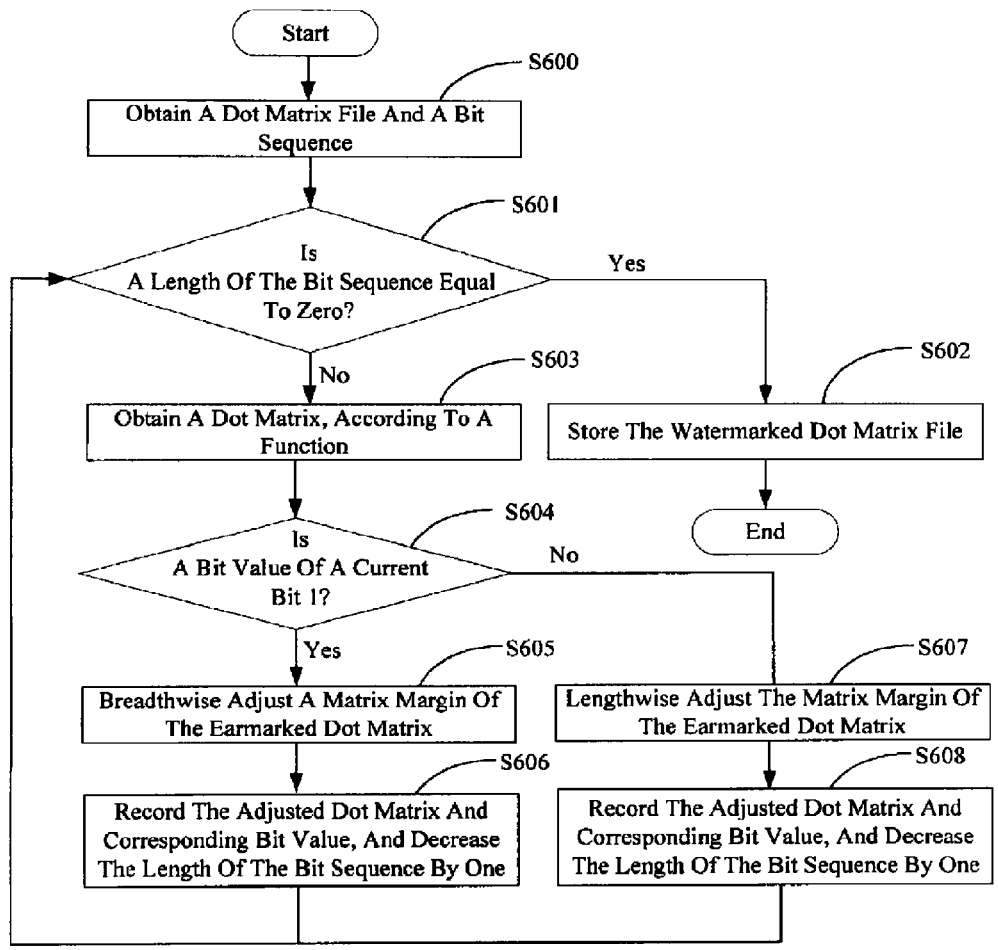
FIG. 6 is a flowchart further detailing steps involved in digital watermarking utilizing the preferred method of FIG. 4.

FIG. 6 is a flowchart further detailing steps involved in digital watermarking utilizing the preferred method of FIG. 4. In step S600, the text obtaining module 31 obtains a dot matrix file to be watermarked and a bit sequence for watermarking from the storing unit 30. The bit sequence may be information indicative of copyright, author, publisher, etc. In step S601, the determining sub-module 321 determines whether a length of the bit sequence is equal to zero. If the length of the bit sequence is equal to zero, the storing module 34 stores the watermarked dot matrix file in step S602, and the procedure is finished. If the length of the bit sequence is not equal to zero, in step S603, the dot matrix obtaining sub-module 320 obtains a dot matrix from the obtained dot matrix file, according to a function as would be known to persons skilled in the relevant art(s). In step S604, the determining sub-module 321 determines whether a bit value of a current obtained bit of the bit sequence is a first value, for example, '1'.

If the bit value of the current bit is '1', in step S605, the encrypting module 33 breadthwise adjusts the matrix margin of the earmarked dot matrix according to a predetermined adjustment value. Typically, the encryption module 33 is capable of performing left shifting or right shifting operations on the pixels of the earmarked dot matrix by the predetermined adjustment value (i.e., one pixel size). Thereby, the matrix margin of the earmarked dot matrix is adjusted breadthwise, and an adjusted dot matrix is generated as a result. In step S606, the storing module 34 records the adjusted dot matrix and the corresponding bit value (i.e., '1'), and decreases the length of the bit sequence by one, whereupon the procedure goes back to step S601.

Conversely, if in step S604 the bit value of the current obtained bit is another value (i.e., '0'), then in step S607, the encrypting module 33 lengthwise adjusts the matrix margin of the earmarked dot matrix according to the predetermined adjustment value. Typically, the encryption module 33 is capable of performing up shifting or down shifting operations on the pixels of the earmarked dot matrix by the predetermined adjustment value (i.e., one pixel size). Thereby, the matrix margin of the earmarked dot matrix is adjusted lengthwise, and an adjusted dot matrix is generated as a result. In step S608, the storing module 34 records the adjusted dot matrix and the corresponding bit value (i.e., '0'), and decreases the length of the bit sequence by one, whereupon the procedure goes back to step S601.

Figure 7:
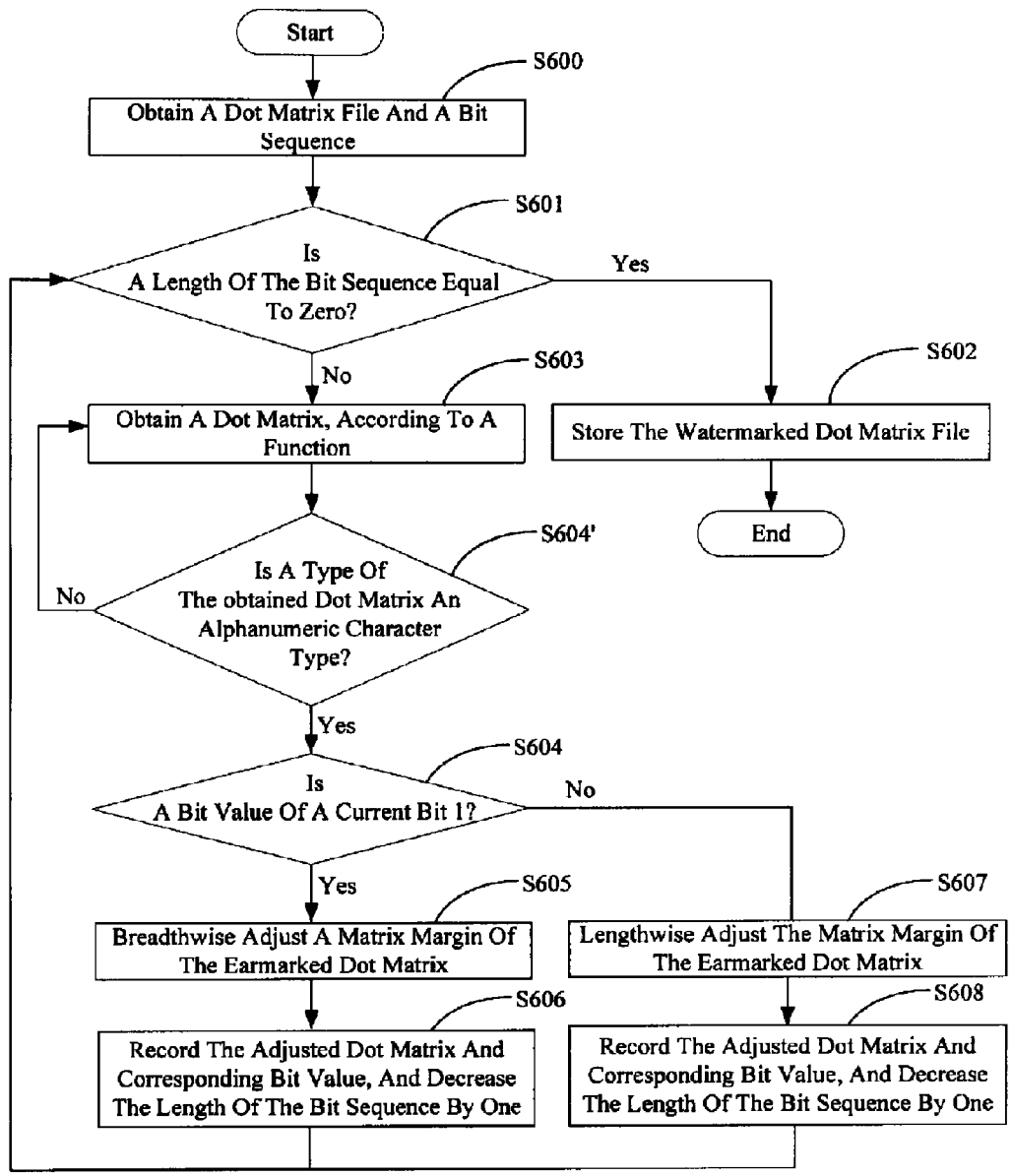
FIG. 7 is a flowchart further detailing steps involved in digital watermarking utilizing a combination of the preferred methods of FIGS. 4 and 5.

FIG. 7 is flowchart further detailing steps involved in digital watermarking utilizing a combination of the preferred methods of FIGS. 4 and 5. The steps of this flowchart are somewhat the same as those of FIG. 6, except for an additional step S604', the determining sub-module 321 determines whether the type of the obtained dot matrix is an alphanumeric character type dot matrix. In particular, in step S604', if the obtained dot matrix is an alphanumeric character type dot matrix, the procedure goes to step S604. Otherwise, the procedure goes back to step S603.

Figure 8A:
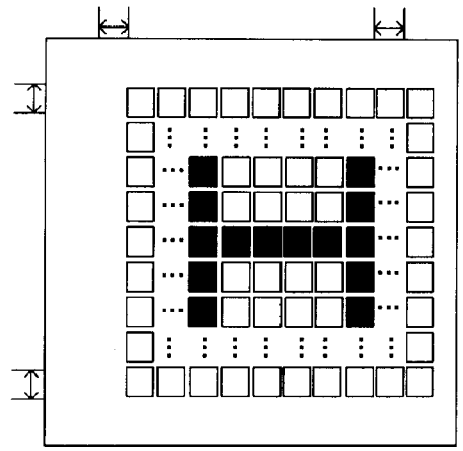
FIG. 8A is similar to FIG. 2, but showing the matrix margin of the dot matrix after being left shifted by one pixel size.

FIG. 8A is similar to FIG. 2, but showing the matrix margin of the dot matrix after being left shifted by one pixel size. Upon watermarking, the pixels of the dot matrix are left shifted by one pixel size, thereby the margin-left 'a' is decreased by one pixel size and the margin-right 'b' is conversely increased by one pixel size, and an adjusted dot matrix is generated.

Figure 8B:
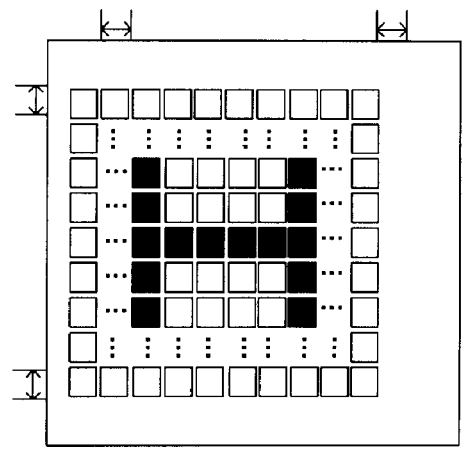
FIG. 8B is similar to FIG. 2, but showing the matrix margin of the dot matrix after being right shifted by one pixel size.

FIG. 8B is similar to FIG. 2, but showing the matrix margin of the dot matrix after being right shifted by one pixel size. Upon watermarking, the pixels of the dot matrix are right shifted by one pixel size, thereby the margin-left 'a' is increased by one pixel size and the margin-right 'b' is conversely decreased by one pixel size, and an adjusted dot matrix is generated.

Figure 8C:
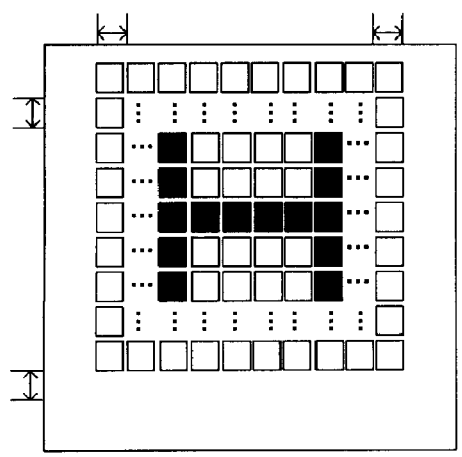
FIG. 8C is similar to FIG. 2, but showing the matrix margin of the dot matrix after being up shifted by one pixel size.

FIG. 8C is similar to FIG. 2, but showing the matrix margin of the dot matrix after being up shifted by one pixel size. Upon watermarking, the pixels of the dot matrix are up shifted by one pixel size, thereby the margin-top 'c' is decreased by one pixel size and the margin-bottom 'd' is conversely increased by one pixel size, and an adjusted dot matrix is generated.

Figure 8D:
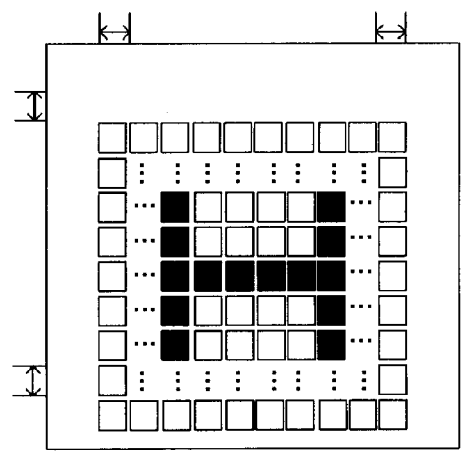
FIG. 8D is similar to FIG. 2, but showing the matrix margin of the dot matrix after being down shifted by one pixel size.

FIG. 8D is similar to FIG. 2, but showing the matrix margin of the dot matrix after being down shifted by one pixel size. Upon watermarking, the pixels of the dot matrix are down shifted by one pixel size, thereby the margin-top 'c' is increased by one pixel size and the margin-bottom 'd' is conversely decreased by one pixel size, and an adjusted dot matrix is generated.

Figure 9:
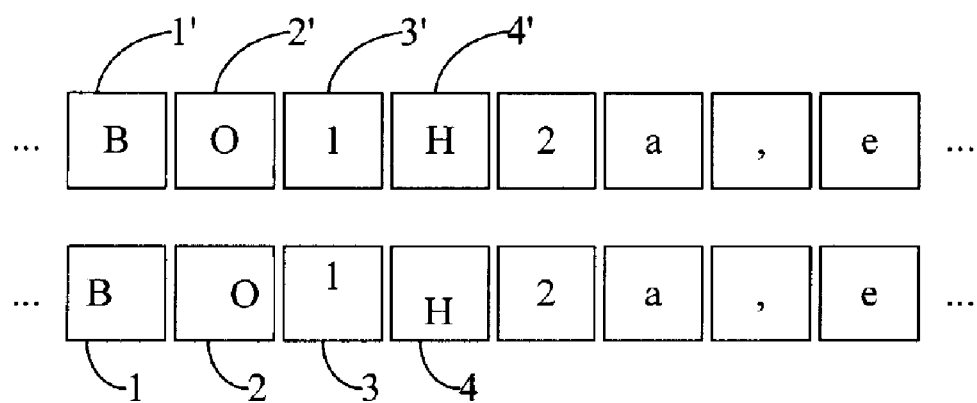
FIG. 9 illustrates exemplary adjustment results of one or more watermarked dot matrixes obtained by utilizing the method of either FIG. 6 or FIG. 7.

FIG. 9 illustrates adjustment results of one or more watermarked dot matrixes obtained by utilizing the method of either FIG. 6 or FIG. 7 described above. By utilizing the steps of either FIG. 6 or FIG. 7, a dot matrix file (i.e., a text) is watermarked. For the sake of simplicity and the convenience of understanding, in FIG. 9, a row unadjusted dot matrixes and a row dot matrixes including one or more adjusted dot matrixes are illustrated. As described above, the matrix margins of the earmarked dot matrixes can be either adjusted breadthwise or adjusted lengthwise. Typically, the breadthwise adjustment of the matrix margins of the earmarked dot matrixes can be performed by either left shifting the pixels thereof or by right shifting the pixels thereof, and the lengthwise adjustment of the matrix margins of the earmarked dot matrixes can be performed by either top shifting the pixels thereof or by down shifting the pixels thereof.

Accordingly, the adjusted dot matrix 1 can be displayed with a lesser margin-left and a greater margin-right as compared to the other unadjusted dot matrix (e.g., in its normal display, the unadjusted dot matrix is 1'), the adjusted dot matrix 2 can be displayed with a greater margin-left and a lesser margin-right as compared to the other unadjusted dot matrix (e.g., in its normal display, the unadjusted dot matrix is 2'), the adjusted dot matrix 3 can be displayed with a lesser margin-top and a greater margin-bottom as compared to its normal display (e.g., in its normal display, the unadjusted dot matrix is 3'), and the adjusted dot matrix 4 can be display with a greater margin-top and a lesser margin-bottom as compared to other adjusted dot matrix (e.g., in its normal display, the unadjusted dot matrix is 4'). Consequently, the adjusted dot matrixes are distinguishable from the unadjusted dot matrixes by the human eye. This means the corresponding text has a visible difference from the normal unwatermarked text. Thereby, pirates who reproduce the text will unintentionally reproduce the digital watermark, thus making it is easier for the pirated text to be traced back to the original master copy of the text.

It is to be noted that even though the English language alphabetic characters are described above and/or exemplified in the drawings herein, this is for the purposes of conveniently illustrating exemplary embodiments of the present invention. The principles exemplified in the above description and drawings are equally applicable to alphabetic characters of various other languages. Furthermore, even though Arabic numeral numeric characters are described above and/or exemplified in the drawings herein, this is for the purposes of conveniently illustrating exemplary embodiments of the present invention. The principles exemplified in the above description and drawings are equally applicable to numeric characters of various other numeral systems (such as Chinese, Japanese, etc). Moreover, even though English language punctuation mark characters are described above and/or exemplified in the drawings herein, this is for the purposes of conveniently illustrating exemplary embodiments of the present invention. The principles exemplified in the above description and drawings are equally applicable to various non-alphanumeric text characters, markings or symbols such as pronunciation symbols, asterisks, stars, hash symbols, mathematical symbols, value symbols, position symbols, etc.

It is to be further noted that although the present invention has been specifically described on the basis of preferred embodiments and preferred methods, the invention is not to be construed as being limited thereto. Various changes or modifications may be made to the embodiment and methods without departing from the scope and spirit of the invention.

What is claimed is:

1. A digital watermarking system comprising:
   a storing unit for storing text information, the text information comprising one or more dot matrix files;
   a text obtaining module for obtaining a dot matrix file to be watermarked from the storing unit, wherein the dot matrix file comprises a plurality of dot matrixes, and each of the dot matrixes has a matrix margin, comprises a plurality of pixels; and each of the dot matrixes is defined to be of one of at least two types, the at least two types comprise an alphanumeric character type and a punctuation type;

a dot matrix determining module, for earmarking a dot matrix to be adjusted if a length of a bit sequence is not equal to zero, wherein the bit sequence comprises an instruction for watermarking the text information;

an encrypting module, for adjusting the matrix margin of the earmarked dot matrix according to a bit value of one bit of the bit sequence; and a storing module, for storing watermarked text information in the storing unit.

2. The digital watermarking system according to claim 1, wherein the adjustment of the matrix margin of the earmarked dot matrix is selected from the group consisting of breadthwise adjusting the matrix margin and lengthwise adjusting the matrix margin.

3. The digital watermarking system according to claim 2, wherein the breadthwise adjustment of the matrix margin of the earmarked dot matrix is selected from the group consisting of left shifting the pixels thereof and right shifting the pixels thereof.

4. The digital watermarking system according to claim 2, wherein the lengthwise adjustment of the matrix margin of the earmarked dot matrix is selected from the group consisting of up shifting the pixels thereof and down shifting the pixels thereof.

5. The digital watermarking system according to claim 2, wherein the dot matrix determining module further comprises a dot matrix obtaining sub-module for obtaining the dot matrix to be adjusted.

6. The digital watermarking system according to claim 5, wherein the alphanumeric character type comprises an item selected from the group consisting of an alphabetic character type and a numeric character type.

7. The digital watermarking system according to claim 6, wherein the dot matrix determining module further comprises a determining sub-module for determining the type of obtained dot matrix, and a type of the earmarked dot matrix is the alphanumeric character type.

8. The digital watermarking system according to claim 7, wherein the dot matrix obtaining sub-module is also for obtaining a new dot matrix to be adjusted if a type of the obtained dot matrix is the punctuation type.

9. A digital watermarking method comprising the steps of:
obtaining text information to be watermarked, wherein the text information comprises one or more dot matrix files, each of the dot matrix files comprises a plurality of dot matrixes, and each of the dot matrixes has a matrix margin and comprises a plurality of pixels; and each of the dot matrixes is defined to be of one of at least two types, the at least two types comprise an alphanumeric character type and a punctuation type;

earmarking a dot matrix to be adjusted if a length of a bit sequence is not equal to zero, wherein the bit sequence comprises an instruction for watermarking the text information;

adjusting the matrix margin of the earmarked dot matrix according to a bit value of one bit of a bit sequence thereby watermarking the text information, wherein the bit sequence comprises an instruction for watermarking the text information; and storing the watermarked text information in a storing unit.

10. The digital watermarking method according to claim 9, wherein the adjustment of the matrix margin of the earmarked dot matrix is selected from the group consisting of breadthwise adjusting the matrix margin and lengthwise adjusting the matrix margin.

11. The digital watermarking method according to claim 10, wherein the breadthwise adjustment of the matrix margin of the earmarked dot matrix is selected from the group consisting of left shifting the pixels thereof and right shifting the pixels thereof.

12. The digital watermarking method according to claim 10, wherein the lengthwise adjustment of the matrix margin of the earmarked dot matrix is selected from the group consisting of up shifting the pixels thereof and down shifting the pixels thereof.

13. The digital watermarking method according to claim 10, wherein the alphanumeric character type comprises an item selected from the group consisting of an alphabetic character type and a numeric character type.

14. The digital watermarking method according to claim 13, wherein a dot matrix is earmarked only if the type of the dot matrix is the alphanumeric character type.

15. A digital watermarking method comprising the steps of:
obtaining text information to be watermarked, wherein the text information comprises one or more dot matrix files, each of the dot matrix files comprises a plurality of dot matrixes, and each of the dot matrixes has a matrix margin and comprises a plurality of pixels;

earmarking a dot matrix of the obtained text information if a length of a bit sequence is not equal to zero, wherein the bit sequence comprises an instruction for watermarking the text information;

adjusting the matrix margin of the earmarked dot matrix according to a bit value of one bit of the bit sequence thereby watermarking the text information;

recording the adjusted dot matrix and corresponding bit value; and storing the watermarked text information.

16. The digital watermarking method according to claim 15, wherein the step of adjusting the matrix margin of the earmarked dot matrix according to a bit value of one bit of the bit sequence further comprises the steps of:
breadthwise adjusting the matrix margin of the earmarked dot matrix if the bit value is equal to a first predetermined value; or lengthwise adjusting the matrix margin of the earmarked dot matrix if the bit value is equal to a second predetermined value.

17. The digital watermarking method according to claim 16, wherein the breadthwise adjustment of the matrix margin of the earmarked dot matrix is selected from the group consisting of left shifting the pixels thereof and right shifting the pixels thereof, and the lengthwise adjustment of the matrix margin of the earmarked dot matrix is selected from the group consisting of up shifting the pixels thereof and down shifting the pixels thereof.

18. The digital watermarking method according to claim 16, wherein each earmarked dot matrix is defined to be of one of at least two types, the at least two types comprise an alphanumeric character type and a punctuation type, and the alphanumeric character type comprises an item selected from the group consisting of an alphabetic character type and a numeric character type.

19. The digital watermarking method according to claim 18, wherein a type of the earmarked pixel is the alphanumeric character type.

* * * * *